(12) United States Patent
Hu et al.

(10) Patent No.: US 11,543,285 B2
(45) Date of Patent: Jan. 3, 2023

(54) DISTRIBUTED OPTICAL FIBER SENSING USING POINT SENSORS

(71) Applicant: NEC Laboratories America, Inc., Princeton, NJ (US)

(72) Inventors: Junqiang Hu, Davis, CA (US); Ting Wang, West Windsor, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/147,382

(22) Filed: Jan. 12, 2021

(65) Prior Publication Data

US 2021/0255007 A1 Aug. 19, 2021

Related U.S. Application Data

(60) Provisional application No. 62/960,260, filed on Jan. 13, 2020.

(51) Int. Cl.
*G01H 9/00* (2006.01)
*G01D 5/353* (2006.01)
*G01L 1/24* (2006.01)
*G01V 1/22* (2006.01)

(52) U.S. Cl.
CPC ......... *G01H 9/004* (2013.01); *G01D 5/35361* (2013.01); *G01L 1/243* (2013.01); *G01V 1/226* (2013.01)

(58) Field of Classification Search
None
See application file for complete search history.

(56) References Cited

U.S. PATENT DOCUMENTS

| | | | |
|---|---|---|---|
| 11,075,786 B1* | 7/2021 | Shattil | H04B 7/0456 |
| 11,175,193 B2* | 11/2021 | Molin | G01D 5/35306 |
| 2012/0017687 A1 | 1/2012 | Davis et al. | |
| 2015/0377738 A1* | 12/2015 | Dorfman | G02B 6/28 356/73.1 |
| 2019/0391291 A1* | 12/2019 | Milne | G01D 5/14 |

FOREIGN PATENT DOCUMENTS

JP 11002572 A 1/1999

OTHER PUBLICATIONS

Cjt, "Lecture 4 Modulation", http://web.mit.edu/6.02/www/f2006/handouts/lecture4.pdf, created Sep. 18, 2006, accessed Mar. 21, 2022. (Year: 2006).*

* cited by examiner

*Primary Examiner* — Michelle R Connelly
(74) *Attorney, Agent, or Firm* — Joseph Kolodka (57) ABSTRACT

Aspects of the present disclosure describe distributed optical fiber sensing systems, methods, and structures that advantageously employ point sensors that send sensory data/information over an attached, distributed optical fiber sensor without using a separate network or communications facility.

14 Claims, 9 Drawing Sheets

DISTRIBUTED OPTICAL FIBER SENSING USING POINT SENSORS

CROSS REFERENCE

This disclosure claims the benefit of U.S. Provisional Patent Application Ser. No. 62/960,260 filed Jan. 13, 2020 the entire contents of which is incorporated by reference as if set forth at length herein.

TECHNICAL FIELD

This disclosure relates generally to distributed optical fiber sensing (DOFS) systems, method, and structures. More particularly, it describes the use of point sensors with DOFS.

BACKGROUND

Distributed optical fiber sensing systems have shown great utility in a number of unique sensing applications due to their intrinsic advantages over conventional techniques. They can be integrated into normally inaccessible areas and can function in harsh environments. They are immune to radio frequency interference and electromagnetic interference and can provide continuous, real-time measurements along an entire length of a fiber optic cable.

Similarly, point sensors—i.e., sensors that perform a specific measurement, have shown great utility in a variety of sensing applications also. Despite their utility—particularly when coupled with dedicated communications networks—point sensors have not been employed in DOFS systems.

SUMMARY

An advance in the art is made according to aspects of the present disclosure directed to distributed optical fiber sensing systems, methods, and structures that advantageously employ point sensors.

In sharp contrast to the prior art, systems, methods, and structures according to the present disclosure utilize point sensors that send sensory data/information over an attached, distributed optical fiber sensor without using a separate network or communications facility.

Of particular advantage, an interrogator that is a component of the DOFS system receives and subsequently decodes point sensor data/information from a received, DOFS optical interrogation signal. Of further advantage, systems, methods, and structures eliminate problems associated with strong power-fluctuation(s), especially for direct-detection of Rayleigh back-scattered signals(s) which oftentimes infirm certain distributed sensing systems.

Viewed from one aspect, systems, methods and structures according to aspects of the present disclosure employ a Distributed Vibration Sensor (DVS) or Distributed Acoustic Sensor (DAS) interrogator that advantageously detects vibrations occurring at any location along a length of sensing fiber.

Sensory data generated from a point sensor positioned along the length of the sensing fiber is encoded into a vibration generated by the point sensor and a vibratory device such as a vibration motor, or a speaker. This vibrating device is attached to the optical fiber and produces mechanical vibrations in the optical fiber. A back-scattered optical signal—i.e., a Raleigh back-scattered signal—conveys data indicative about the vibrations generated. An interrogator receives the back-scattered light using either direct detection or coherent detection and decodes the vibration to recover an original message.

BRIEF DESCRIPTION OF THE DRAWING

A more complete understanding of the present disclosure may be realized by reference to the accompanying drawing in which.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that distributed optical fiber sensing (DOFS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DOFS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DVS (Distributed Vibration Sensor) or DAS (Distributed Acoustic Sensor) interrogator to recover a vibration occurring anywhere along a sensing fiber in equivalent sampling frequency of the pulse repetition rate. For example, for a DVS or DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule.

As we shall show and describe—according to the present disclosure—data/information transmitted from a point sensor/transmitter is encoded in a mechanical vibration generated by the point sensor through the effect of a vibrating device attached to the optical fiber—such as a vibration motor, or a speaker. A back-scattered optical signal—in particular a Raleigh back-scattered signal—conveys the vibration generated by the point sensor/vibrating device.

The interrogator receives the back-scattered light advantageously using either direct detection or coherent detection, and subsequently decodes the vibration to recover the original vibratory "message".

Those skilled in the art will appreciate that the point sensor/vibrating device/transmitter uses a frequency modulation methodology to send the message, which helps in a severe power fluctuation environment of Raleigh fading. Sensor data/information sent is encapsulated in a frame, which includes multiple fixed time slots, each using one frequency (called a "frequency period").

In an illustrative embodiment, a frame includes one or more frequency periods such that the interrogator may determine a starting point, using one or multiple dedicated frequencies. Such periods are similar in function to a preamble; and one or multiple frequency periods for the data/information, through bit(s) to frequency mapping.

By way of illustrative example only, using two frequencies for a binary code, a '0' can be mapped to frequency A, while a '1' mapped to frequency B. In another illustrative example using 4 frequencies for a multi-level code (i.e., a "symbol"), "00" can be mapped to frequency A, "01" to frequency B, "10" to frequency C, and "11" to frequency D.

Operationally, and according to illustrative aspects of the present disclosure, a point sensor/transmitter sends a message in a fixed interval. For any periods of time that it is not sending a message or performing other operation (e.g., collecting data), it may be put in sleep mode to save power.

Once the point sensor is ready (collects data and sends back to interrogator regularly), interrogator logic scans received input for the preamble during an initial synchronization. Operationally, this may be achieved by continuously searching for a preamble from and/or associated with a particular location. Once such preamble is identified and a starting time is calculated, the interrogator will then decode any encoded/conveyed data/information. In subsequent operations, the interrogator will look for a next frame using same time interval as the transmitter associated with the point sensor.

Advantageously—for urgent information—the point sensor may send at any time, using a stronger vibration so that the interrogator will identify it using a regular vibration detection method, and then follow-up using a decoding method according to the present disclosure—to recover the message.

Figure 1:
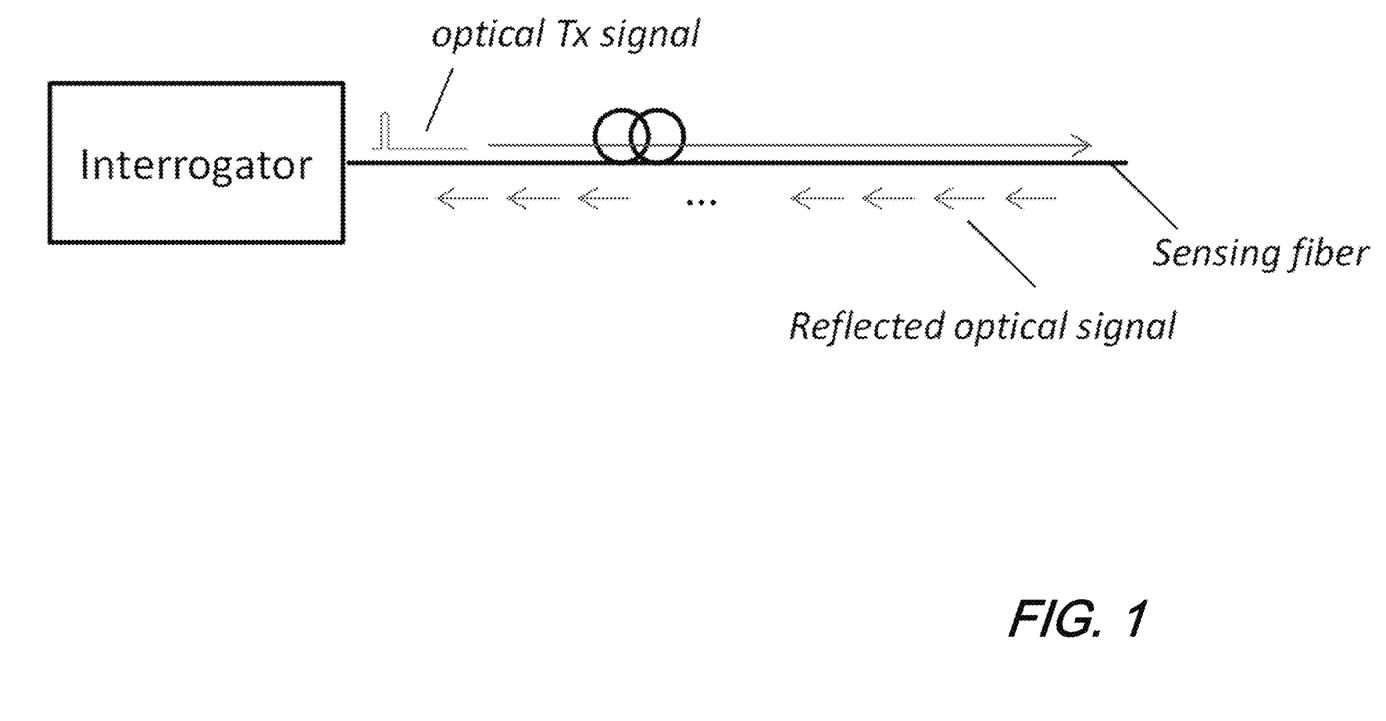
FIG. 1 is a schematic diagram showing an illustrative, prior-art, interrogator and distributed optical fiber sensing system (DOFS)

FIG. 1 is a schematic diagram showing an illustrative, prior-art, interrogator and distributed optical fiber sensing system (DOFS). As may be observed from that figure, such system may comprise a DVS or DAS, which includes an interrogator and its attached sensing fiber. As previously noted, the interrogator periodically provides/injects optical pulses to the fiber. A small portion of the applied pulse(s) is reflected at each location along the fiber while such pulse(s) traverse the length of the fiber. The reflected signal(s) convey information (e.g., vibration to the fiber) to the interrogator. The interrogator continuously samples the backscattered signal, runs pre-processing (such as filtering, normalization) and eventually does per-location processing. For a location i, such a location is associated signals of time $t_i+n*T$, where $t_i$ is the time that the interrogator receives location i's reflection; T is pulse repetition cycle length, and n=0, 1, 2, . . . . Advantageously, the periodic pulse(s) can also comprise a code sequence to increase the system sensitivity and resolution.

Figure 2:
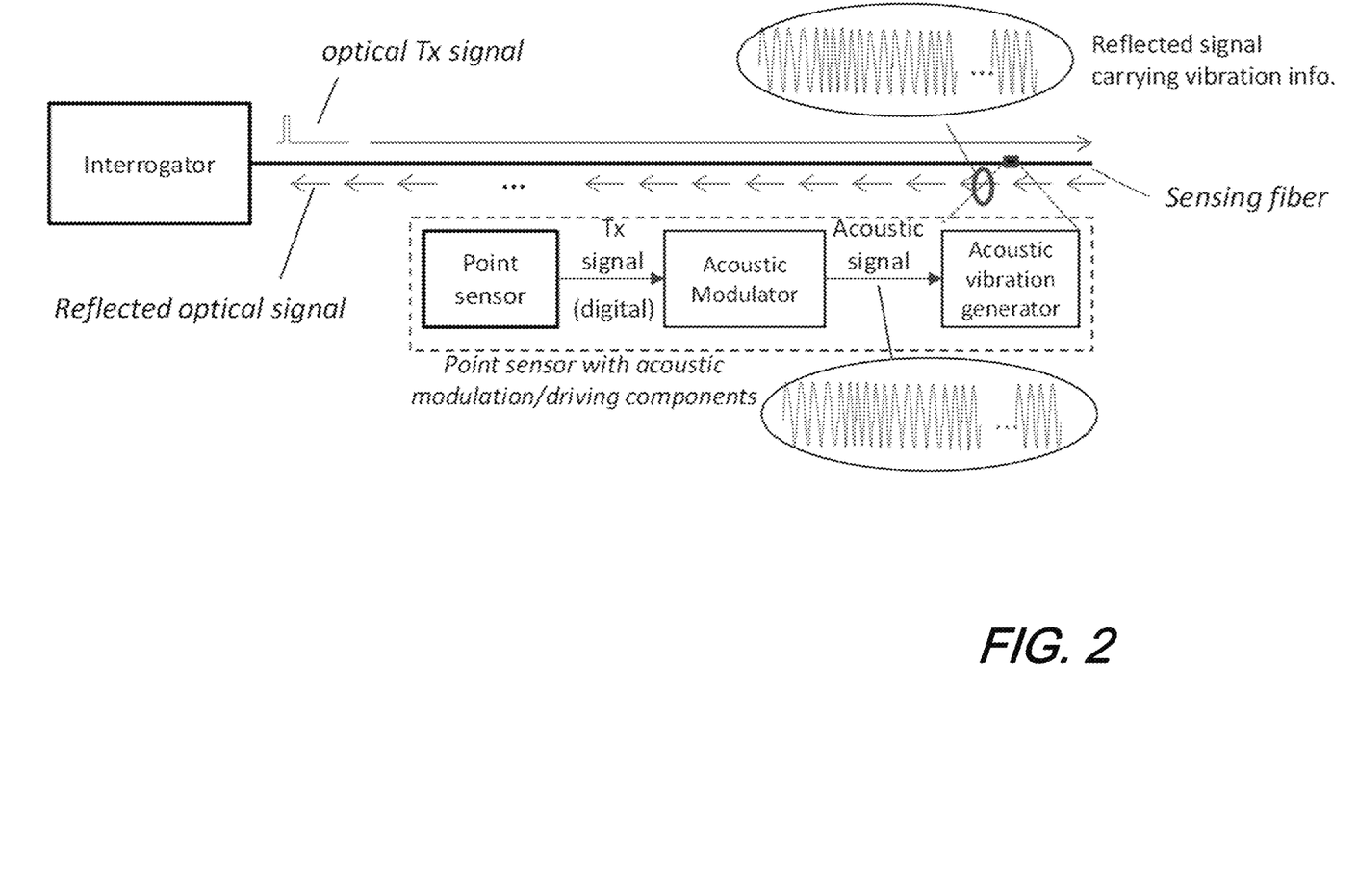
FIG. 2 is a schematic diagram showing an illustrative, point sensor enhanced DOFS system according to aspects of the present disclosure.

FIG. 2 is a schematic diagram showing an illustrative, point sensor enhanced DOFS system according to aspects of the present disclosure. With reference to that figure, it may be observed that one or multiple point sensors are attached to the fiber, to send respective sensed data/information to the interrogator as imparted into the optical fiber via mechanical vibration. As previously noted, a point sensor generally includes structures/circuits/mechanisms to sense a specific characteristic such as a thermistor for temperature sensing, an acoustic modulator that converts digital data representative of the sensed characteristic to an acoustic-modulated signal, and an acoustic vibration generator that converts the acoustic-modulated signal to a mechanical vibration. The vibration generator—attached to the fiber—to imparts a modulated signal onto backscattered light, which is subsequently detected by the interrogator and decoded to recover any information therefrom.

In an illustrative embodiment, the acoustic modulator uses frequency modulation. In a simple binary case, there are two frequencies $f_0$ and $f_1$ (waveform $\cos(2\pi f_0 t)$ and $\cos(2\pi f_1 t)$) used to represent binary '0' and '1' respectively, called frequency-bit. Frequencies $f_0$ and $f_1$ are selected within Nyquist bandwidth, which is below ½ of the interrogator's optical pulse repetition rate. To avoid interference, $f_0$ and $f_1$ are sufficiently away from each other's harmonic frequencies. The frequencies can also be selectable to avoid field interference.

Figure 3:
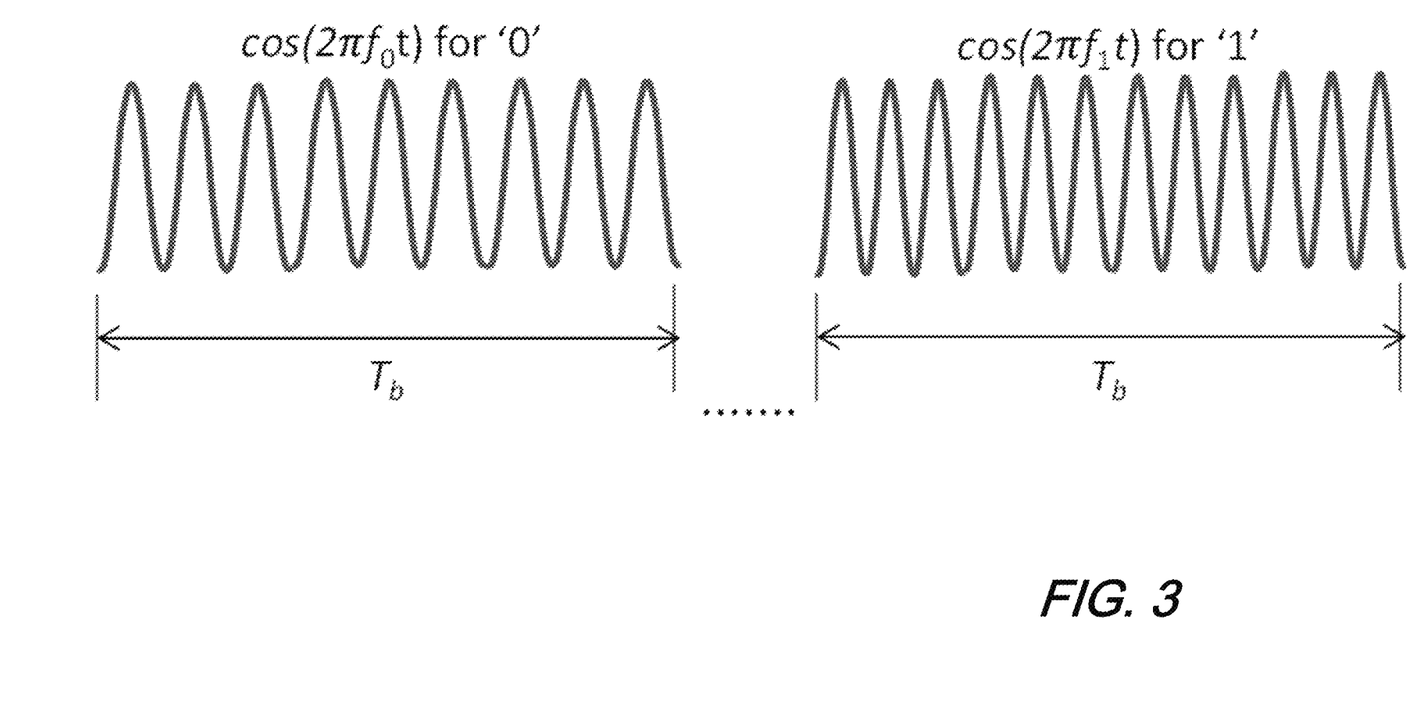
FIG. 3 shows waveform plots illustrating frequency bits in a distributed sensing system according to aspects of the present disclosure.

In such an illustrative scheme, each frequency-bit lasts for fixed time period $T_b$, as illustrated in FIG. 3. In one illustrative embodiment, the acoustic modulator uses $2^n$ frequencies $f_0, f_1, \ldots f_{n-1}$, to represent a symbol of n-bit. Each frequency is called a frequency-symbol.

Figure 4:
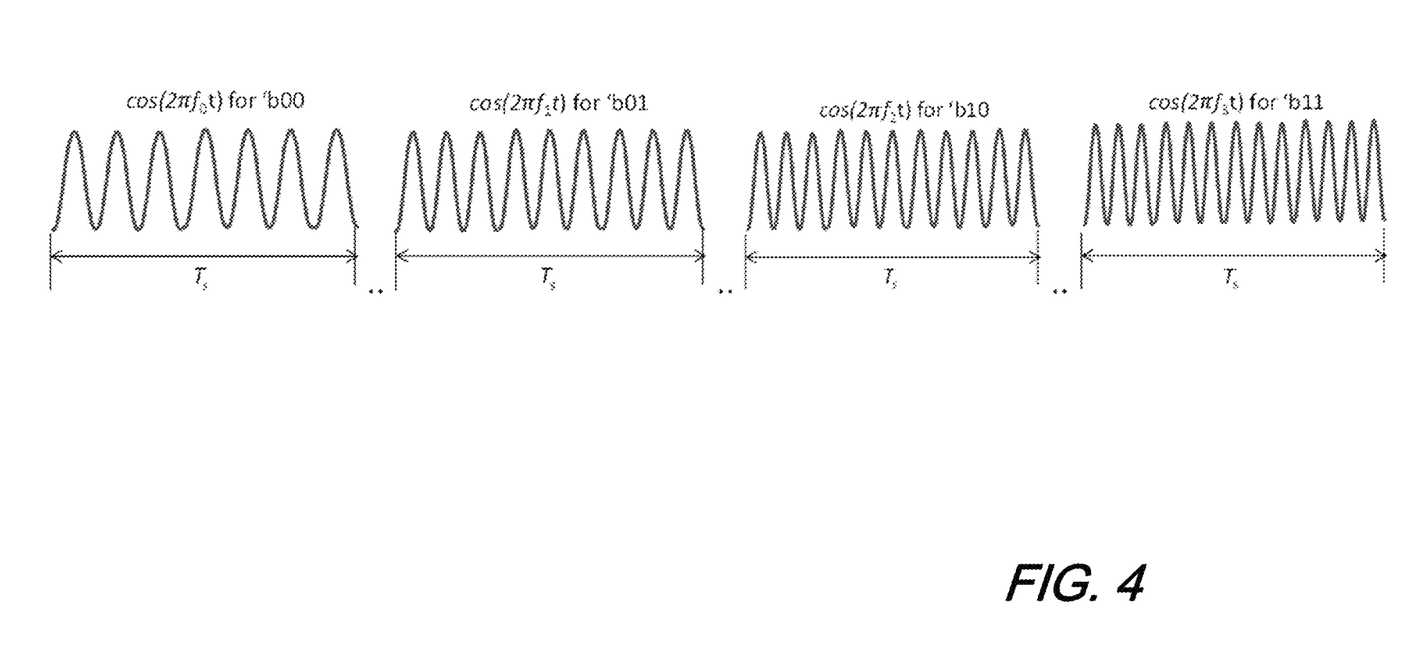
FIG. 4 shows waveform plots illustrating frequency-symbol for an example 2 bit/symbol in a distributed sensing system according to aspects of the present disclosure.

For example, for a 2-bit symbol can use $2^2 = 4$ frequencies: 'b00 (i.e., binary value 00) represented by $f_0$, 'b01 by $f_1$, 'b10 by $f_2$, and 'b11 by $f_3$, as shown in FIG. 4. Similar to binary case, one frequency-symbol lasts for fixed time period $T_s$.

Figure 5:
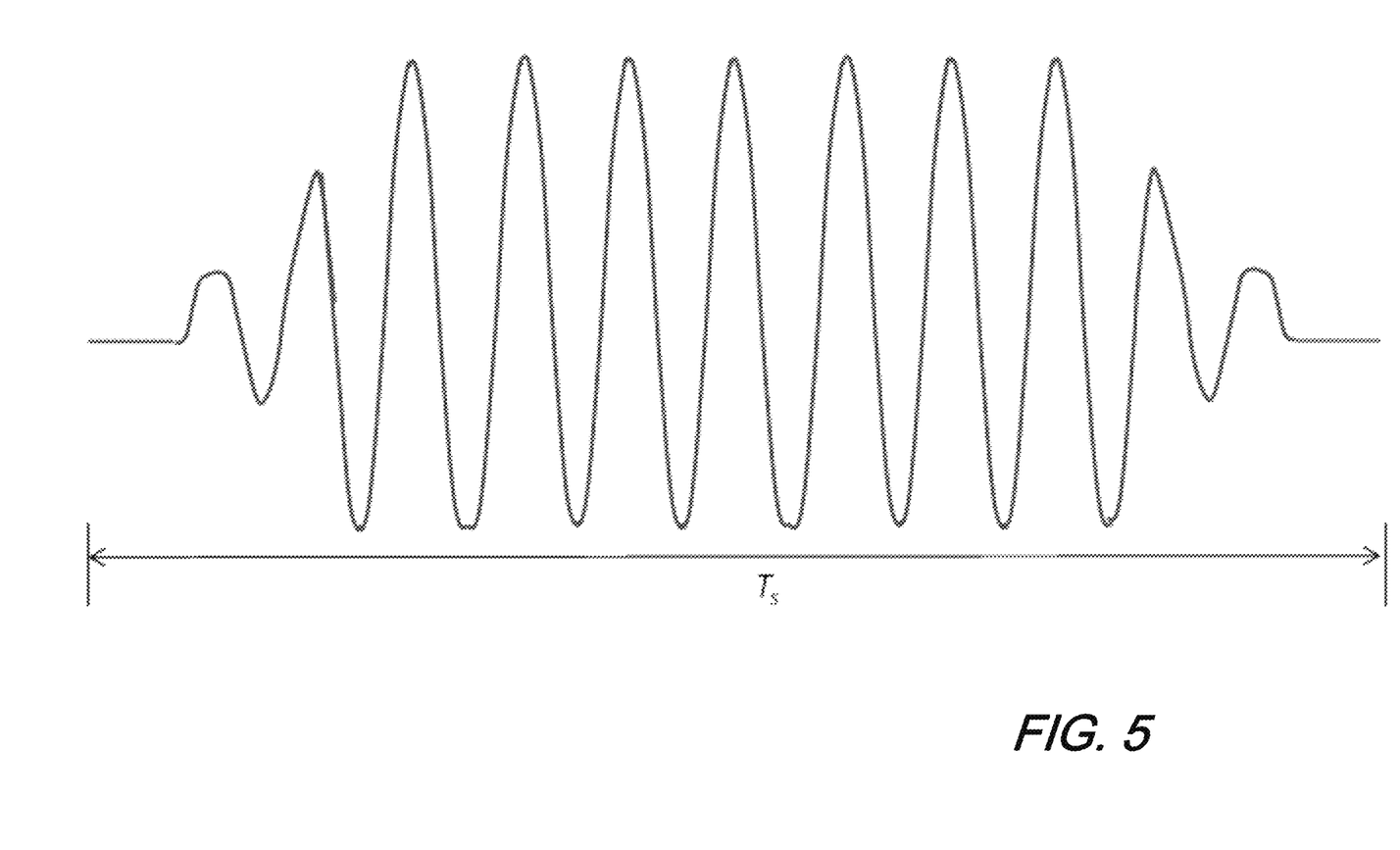
FIG. 5 shows a waveform plot illustrating the application of a window function to frequency-symbol/bit according to aspects of the present disclosure.

In one illustrative embodiment, a window function is applied to a frequency-bit/symbol, for a smooth transition from cosine wave to zero plus certain zero periods, for better timing error tolerance at the interrogator. This is illustratively shown in FIG. 5.

The information to be sent to the interrogator is encapsulated in a frame of fixed format. In one illustrative embodiment, the frame includes a preamble, followed by an information field. The preamble may contain one or multiple bit/symbol periods, using a single frequency, or the combination of multiple frequencies. The preamble may use the same frequencies as information field, or it may employ different frequencies.

Figure 6:
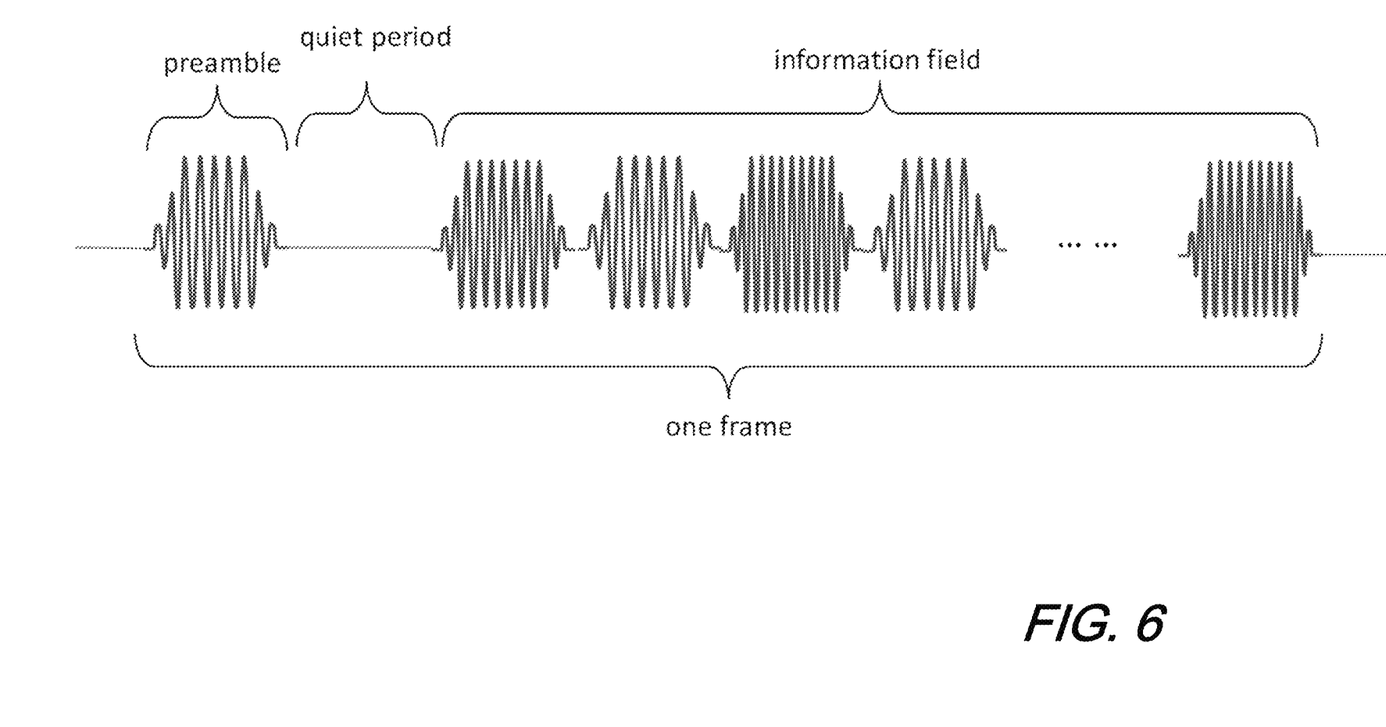
FIG. 6 shows waveform plots illustrating an example frame format according to aspects of the present disclosure.

In one illustrative embodiment, the preamble uses a single frequency followed by a quiet period, before the information field, as shown in FIG. 6 (frame illustration that has preamble, quiet period, and information field). The quiet period helps to identify the center of the preamble, while avoid interference from the information field, especially when the preamble frequency is also used in information field.

Figure 7:
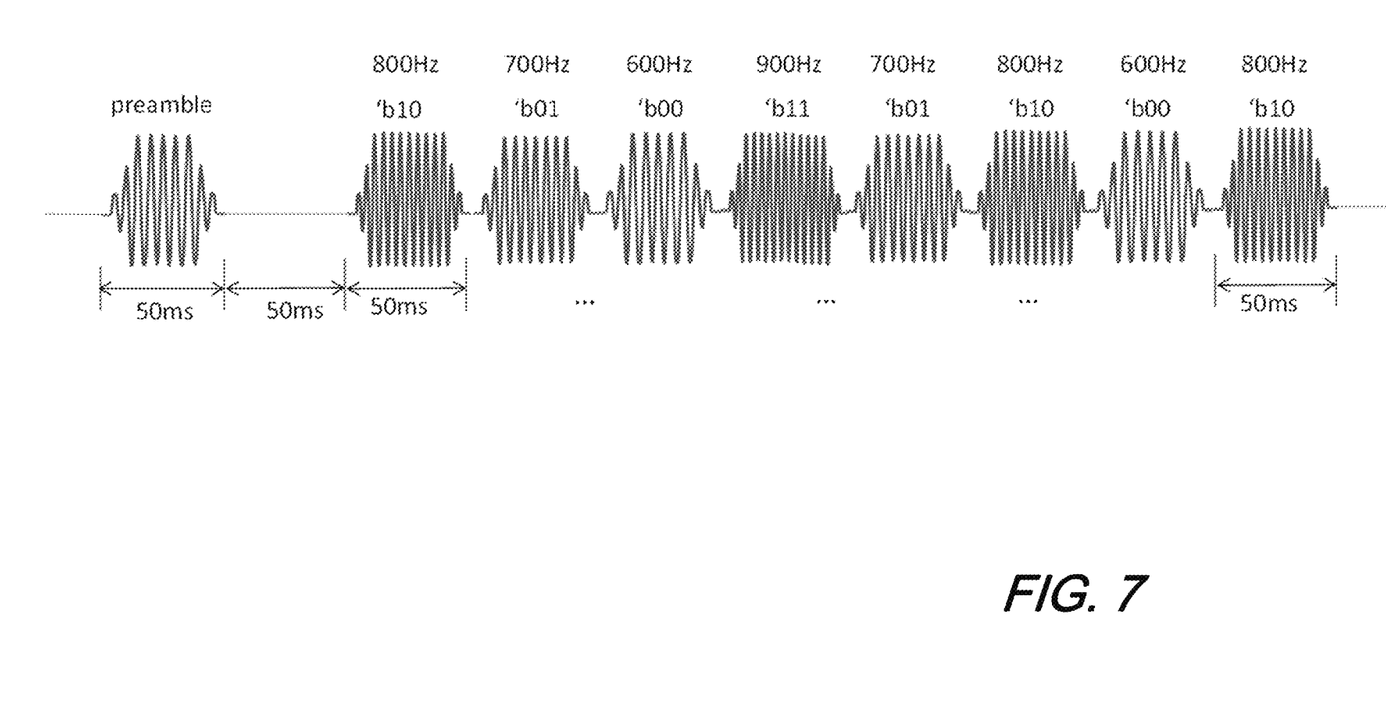
FIG. 7 shows waveform plots illustrating an example frame format for information bits B1001001101100010 according to aspects of the present disclosure.

In an illustrative implementation, the frame uses 600 Hz, 700 Hz, 800 Hz, and 900 Hz frequencies, to support 2 kHz pulse repetition rate. Each frequency interval is for a 2 bit symbol, e.g., 600 Hz for 'b00, 700 Hz for 'b01, 800 Hz for 'b10, and 900 Hz for 'b11. The preamble uses 600 Hz (or any of the other frequencies that has better response). Suppose one frequency period is 50 ms, then for information 'b1001001101100010, the frame is shown in FIG. 7.

Advantageously, an acoustic modulator according to aspects of the present disclosure may be an MCU (Micro-Controller Unit) plus a DAC (Digital-to-Analog Converter), that the MCU maps the symbols into discrete windowed-waveforms and outputs to DAC, followed by a low-pass filter to remove high frequency harmonics. The MCU and DAC can be integrated into a single chip, or different chips (i.e., MCU and a dedicated audio chip) that are connected through I2S (Inter-IC Sound) interface. The acoustic modulator can also use the MCU's integrated PWM (Pulse-Width Modulation) module, to generate the desired frequency by changing the PWM cycle length.

As will be readily apparent to those skilled in the art, a DVS or DAS according to aspects of the present disclosure, exhibits the ability to detect induced vibration from any location along the fiber. By using this feature, the point sensor can send out the information at any time.

Operationally, the DVS or DAS interrogator regularly executes vibration detection operations for locations of interest along the fiber. Once there is vibration detected from where a point sensor is mounted, and is considered to be valid signal (e.g., above certain threshold), the demodulator inside the interrogator will process the received signal from that location and perform the demodulation. As will be appreciated, such operation requires a certain signal-to-noise ratio (SNR) for signal received at the interrogator, to be able to detect the vibration, which in turn requires a certain power level from the vibration generator.

Those skilled in the art will appreciate that frequency modulation has the advantage that, even when the SNR is low, the receiver may still be able to obtain a peak spectrum through FFT (Fast Fourier Transform). This means the signal may be demodulated properly even when there is no vibration detected by the interrogator using regular approach. To reduce the interrogator's processing load, a point sensor may send the information in a fixed interval, so that the interrogator only need to process signals received during that interval once synchronization is achieved.

Figure 8:
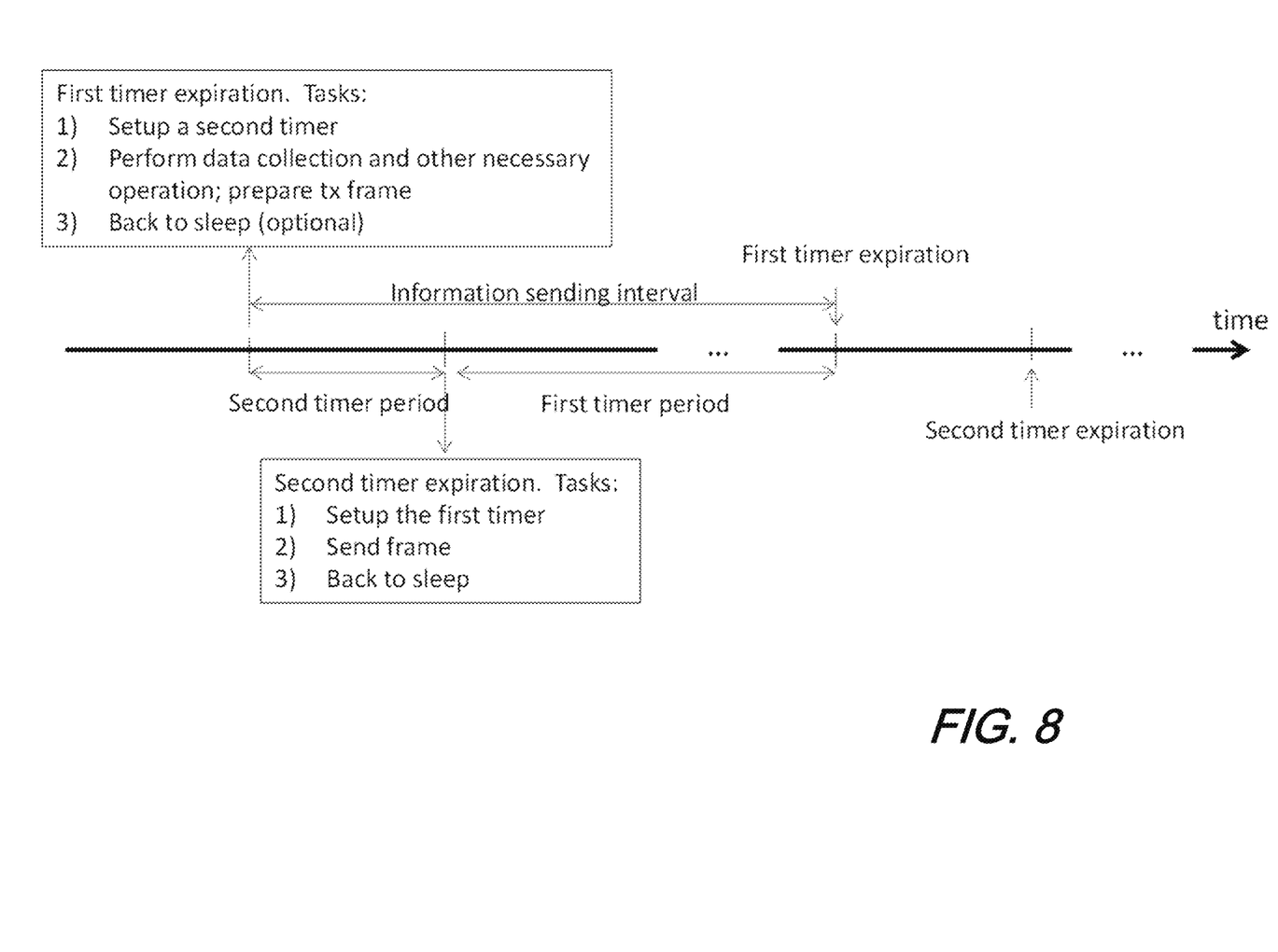
FIG. 8 shows a schematic block diagram illustrating a microcontroller unit (MCU) operation timing according to aspects of the present disclosure.

In one illustrative operational embodiment—while the MCU is in normal mode and not processing or sending information, it may be placed into sleep mode. Upon wakeup, it sets a first timer, and then does regular processing such as data collection. Once the first timer expires, the MCU sets a second timer, and then sends out information through acoustic modulator. After that information is sent, the MCU finishes one cycle of processing, and it can return to sleep mode again. The expiration of the second timer wakes up the MCU for another round of processing. The sum of the first and second timer is the information sending interval, which is roughly a constant value. The second timer period is long enough for the MCU to do data collection and other necessary operation, while as short as possible to let the sent information reflect the most recent status. This procedure is shown in FIG. 8.

The above two illustrative approaches can be used with the same point sensor. In normal operation, the point sensor sends information in a fixed interval with a lower vibration level. For more urgent information to be sent immediately—such as an alarm message—the point sensor will use higher vibration level to trigger the interrogator.

For applications that require global synchronization, the point sensors may have a global timing device such as a GPS, to send information only at the assigned time slots. This enables the interrogator to work/demodulate only at those intervals.

Figure 9:
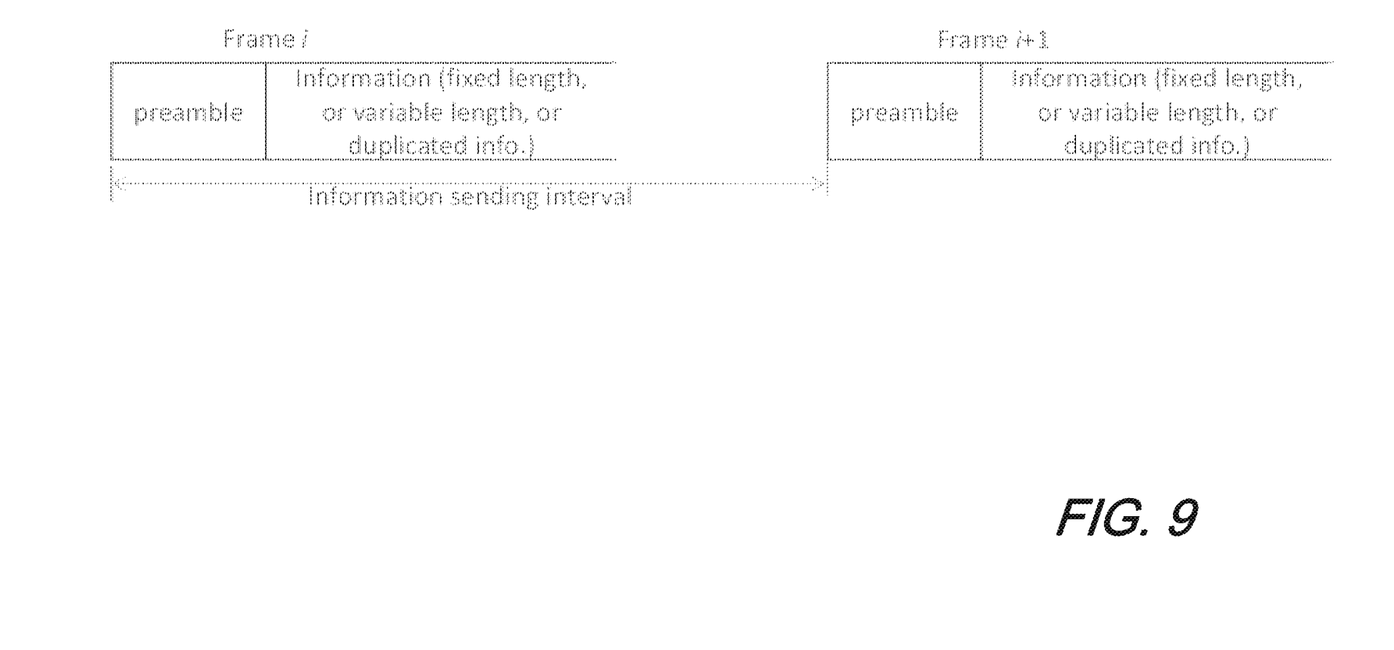
FIG. 9 shows illustrative, flexible frame length(s) with a fixed sending interval according to aspects of the present disclosure.

To increase any tolerance to Raleigh fading—for information that requires higher delivery confidence—the MCU may send duplicate frames following the regular one. Operationally, the interrogator/receiver checks whether valid spectrum peaks are found following the first frame, to decide whether there are duplicated frame(s) to receive. Similar approach can be used for variable information lengths, in that the frames always start from the fixed interval, and additional valid spectrum peak means longer frame is received. This is shown in FIG. 9. Note that frame delivery correctness can also be improved by using parity check and/or using error correction code.

At this point, while we have presented this disclosure using some specific examples, those skilled in the art will recognize that our teachings are not so limited. Accordingly, this disclosure should only be limited by the scope of the claims attached hereto.

The invention claimed is:

1. A distributed optical fiber sensing (DOFS) system comprising:
a length optical fiber cable;
a DOFS interrogator system in optical communication with the optical fiber cable; and
one or more point sensor systems in mechanical communication with the length of optical fiber cable;
wherein the one or more point sensor systems include: a sensor, an acoustic modulator, an acoustic vibration generator, and two timers configured such that a fixed time-interval transmission period is realized and one of the two timers triggers regular operations including data collection and the second timer triggers data transmission and a sum of the two timer's values is a constant value.

2. The DOFS system of claim 1 wherein the sensor is one selected from the group consisting of temperature sensor, vibration sensor, and strain sensor.

3. The DOFS system of claim 1 wherein the acoustic modulator converts digital data representative of an environmental condition sensed by the sensor into an acoustic-modulated signal.

4. The DOFS system of claim 1 wherein the acoustic vibration generator converts the acoustic-modulated signal to a mechanical vibration applied to the optical fiber.

5. The DOFS system of claim 4 wherein acoustic modulated signal is a frequency modulated signal.

6. The DOFS system of claim 5 wherein the frequency modulated signal incudes two frequencies $f_0$ and $f_1$ (waveform $\cos(2\pi f_0 t)$ and $\cos(2\pi f_1 t)$ used to represent binary '0' and '1' respectively.

7. The DOFS system of claim 6 wherein frequencies $f_0$ and $f_1$ are selected within Nyquist bandwidth, which is below ½ of the interrogator's optical pulse repetition rate.

8. The DOFS system of claim 7 wherein $f_0$ and $f_1$ are sufficiently spaced away from each other's harmonic frequencies and be selected to avoid field interference.

9. The DOFS system of claim 7 wherein each frequency-bit lasts for fixed time period $T_b$, and the acoustic modulator uses $2^n$ frequencies $f_0, f_1, \ldots f_{n-1}$, to represent a symbol of n-bit.

10. The DOFS system of claim 9 wherein each frequency-bit is windowed.

11. The DOFS system of claim 5 wherein the frequency modulated signal included information encapsulated in frames, each frame having a preamble wherein the preamble is encoded at a fixed frequency.

12. The DOFS system of claim 11 wherein the preamble includes data indicative of a quiet period representing no mechanical vibrations.

13. The DOFS system of claim 12 wherein the frame is a fixed length.

14. The DOFS system of claim 12 wherein the frame is of variable length from one frame to another, including duplicate information.

* * * * *